June 7, 1960  M. MARKARIAN  2,940,025
ELECTRICAL CAPACITOR
Filed April 9, 1959

*INVENTOR.*
MOUSHY MARKARIAN
BY
*ATTORNEYS*

United States Patent Office 2,940,025
Patented June 7, 1960

2,940,025

ELECTRICAL CAPACITOR

Moushy Markarian, Williamstown, Mass., assignor to Sprague Electric Company, North Adams, Mass., a corporation of Massachusetts Filed Apr. 9, 1959, Ser. No. 805,340

1 Claim. (Cl. 317—258)

The present invention relates to oil impregnated electrical capacitors and in particular to non-dripping oil impregnated capacitors.

Cardboard-tubular, wax-sealed capacitors have been made by enclosing a convolutely wound capacitor section within a tubular cardboard casing, impregnating the section with a suitable dielectric oil or wax, filling the ends of the casing with a wax end seal, and coating the assembly with a suitable high temperature microcrystalline hydrocarbon wax.

Capacitors of the type described have not been suitable for operation at temperatures much above 85° C. At these temperatures the dielectric oil or wax becomes more fluid and/or dissolves the outer coating of microcrystalline hydrocarbon wax and/or the end-seal wax forming a eutectic mixture of reduced melting point. As a result, the outer protective layer and/or the impregnant of the capacitor assembly will leak or drip. This is highly undesirable for several reasons. First, the oil or wax which drips from the capacitor may contact a hot object such as a tube or resistor whose surface temperature is above the flash-point of the oil or wax, resulting in a fire. Second, removal of the outer coating may cause greatly reduced humidity resistance. Third, if appreciable dielectric leaks from the section, the breakdown voltage may be lowered.

An object of the present invention is to overcome the foregoing and related disadvantages.

Another object of this invention is to produce the inexpensive, oil-impregnated capacitor that will not drip at elevated temperatures and that can be operated at temperatures as high as above 100° C.

It is still a further object of this invention to provide a capacitor having tightly wound convolutions of paper dielectric spacers with thorough impregnation of an impregnant exhibiting non-dripping properties up to at least 110° C. when in operation.

Additional objects of the invention will become apparent from the following description considered together with the appended drawings wherein.

According to this invention there is provided a non-dripping electrical capacitor comprising at least two electrodes of opposite polarity separated by porous paper dielectric spacing material in tightly wound convolute turns and in which there is an impregnant. The impregnant in the pores of the porous paper dielectric spacing material is a gelled mineral oil. The mineral oil contains a hydrocarbon gellant which increases the viscosity of the mineral oil so that at temperatures below 110° C. the mineral oil loses its ability to drip from the capacitor and that in use the dripping of the impregnant from the capacitor will not occur, even at maximum operational temperatures. The hydrocarbon gellant dissolved in the impregnant of this invention is a hard crystalline polyethylene resin having an average molecular weight of about 1,000 to about 2,500. The impregnating oil contains between about 10% and about 30% of the gelling compound and preferably between about 20% and about 25% by weight of the gelling compound. This impregnating oil has a viscosity to permit impregnation of the pressed together layers of paper dielectric spacer in the tightly wound capacitor section at a temperature which does not injure the properties of the paper.

Figure 1:
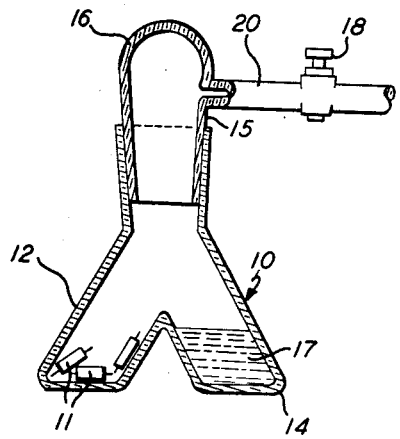
Fig. 1 is a schematic showing of a condenser impregnating apparatus suitable for use with the invention.
Figure 2:
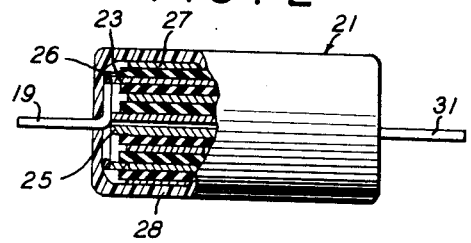
Fig. 2 is a view partly in section of an impregnated condenser exemplifying the invention.

Figure 2 shows an embodiment of a capacitor section according to this invention. A capacitor section 21 consist of convolutely wound foils 23 and 27 of conductive material such as aluminum separated by a dielectric spacer 26 of paper such as calendered kraft paper. The foils 23 and 27 and the dielectric spacer 26 are tightly wound under tension into convolute turns of the rolled capacitor section 21. The layers of foil and spacer are pressed together by the tight winding. To complete the electrical connections of the capacitor section 21 a terminal lead 29 is soldered to the edges of the turns of the foil 23 at 25 and a second terminal lead 31 is soldered to the edges of the turns of the foil 27. The capacitor section is substantially completely impregnated with an impregnant 28 comprised of a mineral oil and a gelling compound of hard crystalline low molecular weight polyethylene resin which causes the impregnant to become a non-dripping gel upon cooling after hot impregnation in a device such as described in connection with Figure 1. The capacitor section 21 may be assembled by tightly winding the foils 23 and 27 and two spacers 26 to provide a layered structure in a convolutely wound unimpregnated section 21 comparable to capacitor sections 21. The unimpregnated section 21 is then placed in the leg 12 of the apparatus of Figure 1. The leg 14 of apparatus 10 is filled with a mixture of hard crystalline polyethylene resin solute in mineral oil in a proportion of from about 10% to 30% by weight of the mineral oil. The polyethylene resin has an average molecular weight of about 1,000 to about 2,500 and has low viscosity at temperatures within the temperature range not deleterious to the electrical properties of the paper spacer.

The apparatus is placed in an oven and heated to 150° C. It is evacuated to reduce the pressure down to a sub-atmospheric pressure of about 300 microns to about 50 microns of mercury. The apparatus is then dipped to cause the impregnant 17 to flow from leg 14 to leg 12 and cover the capacitor section 21. The vacuum is maintained for about 15 minutes in this sub-atmospheric range of from 300 to 50 microns of mercury. After the period of 15 minutes or longer of impregnation under vacuum the sections 21 have impregnated into the porous spacing material the impregnant of the polyethylene resin dissolved in mineral oil. After this time the vacuum may be broken by the admission of air and the apparatus allowed to stand in the oven for an additional half hour. During this time the sections 21 remain covered with the impregnant 17. The polyethylene resin mineral oil impregnant has a low viscosity at the impregnation temperature of 150° C. of this process and is impregnated into the sections 21. The impregnation cycle may be repeated as required to insure complete impregnation. The liquid is then poured off the capacitor sections 21 which are subsequently removed, drained of excess liquid and cooled to room temperature. The completed capacitor section may then be housed in a waxed, sealed cardboard tubular casing and the capacitor section may be encased in other suitable enclosures such as a sprayed, dipped, cast or molded thermoplastic housing. A further housing preferred in certain applications is a pressure molded thermoset phenolic casing, e.g. mineral filled phenol-formaldehyde resin. The wax may be applied by simple dipping, high melting waxes such as ceresin being very effective. The impregnant disclosed herein does not substantially reduce the melting point of the wax seal and/or the wax coating as do most dielectric oils. Normally, the units are placed within an external wax or other type of housing, as explained above. However, in some instances, the complete assembly is first housed in a cardboard tube with porous cement end seals, and then impregnated with the dielectric material of the invention. Since the latter is a hydrocarbon, it reduces the insignificance the transmission of moisture through the end seal pores of the impregnated product.

The completed capacitor section of this invention exhibits the maximum possible capacitance and high breakdown properties. The sections of this invention are impregnated throughout the porous paper spacing material with an elimination of dry spots within the convolute windings of the capacitor. A proper impregnation of the sections is thus achieved with the impregnant of hard crystalline polyethylene resin dissolved in mineral oil. After impregnation the impregnant becomes gelled on cooling of the section. The gelation of the impregnant takes place at temperatures no lower than about 94° C. and the gelation of the liquid impregnant takes place at temperatures in the range of about 94° C. and higher. The hard crystalline resin solute has a resin transition temperature of at least 110° C. The viscosity of the resin-containing mineral oil impregnant at 150° C. should be substantially less than 250 centipoises. In the temperature range between gelation and resin transition (flow) point, the viscosity of the resin-containing oil should be at least 250 centipoises. The molecular weight range found effective in the practice of my invention is in the case of polyethylene, from about 1,000 to about 2,500 expressed as average molecular weight. The resin should be incorporated in the impregnant to the extent of from about 10% to about 30% by weight. In a typical case, a mineral oil dielectric impregnant had dissolved therein 25% of polyethylene of average molecular weight of about 2,100. The resulting impregnant gelled at 94° C. and had a viscosity of over 450 centipoises from this point of 110° C. At the impregnating temperature of 150° C. the viscosity was 162 centipoises; a viscosity which enables one to fully impregnate even the most tightly wound sections and the premolded sections, which of necessity must be impregnated when under substantial compressional forces.

The tightly wound capacitor sections 21 of this invention containing a paper dielectric are thoroughly impregnatable at an impregnating temperature of 150° C. with the impregnant of hard crystalline polyethylene resin solute in a mineral oil impregnant in a proportion of from about 10% to 30% of the resin by weight of the mineral oil. The paper dielectric is not affected by the impregnation temperature of 150° C. On cooling of the section a gel is produced at a temperature of around 94° C. to form a viscous non-dripping composition. This composition when used to impregnate capacitor is non-dripping at temperatures up to 110° C., as up to this temperature it has a viscosity of at least 250 centipoises.

Figure 3:
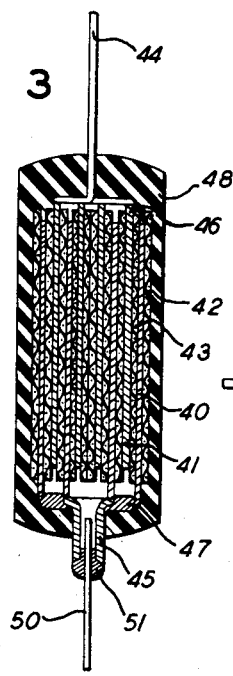
Figs. 3 and 4 are views partly in section of impregnated capacitors exemplifying two further embodiments of the invention.

The capacitor shown in Figure 3 comprises a further embodiment of this invention and particularly a molded tubular type of capacitor impregnated with the gelled oil of this invention. In Fig. 3 it will be seen that 40 and 41 represent electrode foils of the capacitor section convolutely wound and separated by porous paper dielectric spacing materials 42 and 43. The dielectric spacers 42 and 43 consist of a porous paper dielectric film, the pores of which are substantially completely impregnated with the gelled polyethylene mineral oil constituting the instant invention. 44 represents a terminal wire, preferably tinned copper, which is soldered to the extended edges of the electrode foil 40 by means of solder 46. 45 points out a terminal eyelet joined by means of solder 47 to the extended edges of foil 41, some space in the center being left unsoldered to permit impregnation. Terminal wire 50 is solder-sealed to eyelet 45 after impregnation with the gelled dielectric by means of solder 51. The terminal wire 50 alternatively could be crimped while in the eyelet 45 to achieve electrical connection and effective sealing of the gelled dielectric. 48 represents the molded resin casing. The molded tubular assembly is fully disclosed and claimed in the Robinson et al. United States Patent No. 2,682,626, issued June 29, 1954. As an example of the molded tubular assembly impregnated with the gelled impregnant constituted in this invention a 600 volt unit was prepared by using aluminum foil separated by three layers of 0.00035" kraft paper. The unit was encased in a silica filled phenol formaldehyde resin. Prior to sealing the device by means of soldering terminal wire 50 to the eyelet 45 by means of solder 51, the unit was impregnated with a mixture of 20% polyethylene of average molecular weight of 2100 in mineral oil. Impregnation was accomplished at 150° C. with the impregnant having unusually low viscosity.

Figure 4:
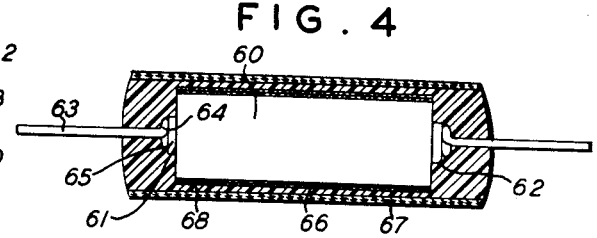

Referring now to Fig. 4 a further embodiment of the invention is shown in which the gelled impregnant is used to impregnate the so called "paper tubular" type of capacitor. In Fig. 4, 60 represents a convolutely wound condenser section of the so-called non-conductive type having the edges 61 and 62 of the two electrode foils extending beyond the edges of the dielectric spacer to facilitate terminal connection. The terminal wires, as shows at 63, are provided with a "pigtail" 64 which is soldered to the foil edge 61 by means of solder 65. Convolutely wound about the condenser section, preferably during the winding of the latter, is an insulating wrapper 66 which protects the capacitor section 60 from contacting the paper tube 67 serving as an enclosure means for the section. This insulating wrapper 66 usually consists of several turns of the capacitor dielectric spacer with a general total of about 0.004" thickness being satisfactory. This paper tubular enclosure 67 usually consists of two layers of a 0.002" thick kraft paper with a fish glue coating serving as the bonding medium. Since this outer wrapper is designed to electrically insulate the capacitor section from outside conductors, the thickness is selected by the conditions to be met. After assembly of the section within the tubular enclosure 67, the condenser may be vacuum dried and thereafter impregnated with the polyethylene mineral oil gel of this invention. After such impregnation with the gel indicated at 68 the ends of the enclosure are filled with a high melting point wax, that is a melting point in excess of a maximum temperature of operation to which the device is to be subjected. At the same time or shortly thereafter, the outer tubular casing is dipped in wax to pick up an overall surface coating. As an example of specific embodiments of sections constructed in this manner, a 1600 volt unit was prepared by using three layers of 1 mil thick kraft spacer between aluminum electrode foils. A 200 volt unit suitable for operation at temperatures in excess of 85° C. is produced by using as the dielectric spacer one each of a 0.0004" and a .0005" thick kraft spacer. These units were thereafter impregnated with a highly refined mineral oil having dispersed throughout its system 25% of polyethylene having an average molecular weight of 1500 at an impregnation temperature of 150° C.

Instead of using wax to fill the enclosure ends, a cement end seal such as that described in Dorst U.S. Patent No. 2,596,134, granted May 13, 1952, can be used as indicated above. Alternatively, the projecting ends of the paper board housing can be crimped over against the leads as, for example, using the technique employed in crimping over paper board ends of shot gun shells. In the crimped modification the crimped-over ends can be arranged to be so firmly pressed against the condenser leads that no plugs of wax, cement or other material are needed. However, an ordinarily liquid impregnant can bleed past the crimped-over ends along the terminal leads unless great care is taken in the crimping. With the impregnant of the present invention such bleeding is prevented and the crimping can be more readily effected with much greater tolerance.

As indicated previously, the compound employed for the gelling action is hard crystalline polyethylene resin with an average molecular weight of about 1000 to about 2500. This resin has a gelling action at a temperature higher than 80° C. or about 94° C. On the other hand, its transition or melting point of the resin if a solid is about 110° C. In other words, the temperature difference between the minimum temperature of the gelling action and the maximum temperature for the softening and liquefying of the polyethylene resin is relatively small and not more than 30°. Preferably this temperature differs less than 30°. In this temperature range between the gelation point and the resin transition (flow) point the viscosity of the resin-containing oil is at least 250 centipoises or more. The polyethylene resin having an average molecular weight of from about 1000 to about 2500 is effective as a gelling compound with these properties and giving the impregnated oil the disclosed characteristics. The resin should be incorporated in the impregnant to the extent of from about 10% to about 30% by weight. In a typical case, a mineral oil dielectric impregnant had dissolved therein 25% of polyethylene of average molecular weight of about 2,100. The resulting impregnant gelled at 94° C. and had a viscosity of over 450 centipoises from this point to 110° C. At the impregnating temperature of 150° C. the viscosity was 162 centipoises; a viscosity which enables one to fully impregnate even the most tightly wound sections and the premolded sections, which of necessity must be impregnated when under substantial compressional forces.

If the concentration of the polyethylene becomes in excess of about 30%, the oil then behaves more like a solid rather than showing the corona prevention characteristics of the liquid mineral oil. The impregnant is then susceptible to developing cracks and paths of lower dielectric strength when operated at room temperature or somewhat below.

It is a feature of this invention that the gelation temperature for the impregnating oil with the low molecular weight of polyethylene as a solute is of the order of 94° C. This high gelation temperature provides the non-dripping properties of the impregnant. It is a further feature of this invention that the impregnating oil with the high gelation temperature has a very low viscosity at the capacitor impregnating temperatures. This provides a complete impregnation of the capacitance sections eliminating dry areas in the innermost portions of the fillings or other evidences of improper impregnation, such as failure to achieve the full capacitance in the section or an improperly low breakdown voltage for the impregnated capacitor.

The capacitor of this invention is capable of non-drip and extended operation at higher than normal temperatures because of the use of gelled mineral oil. The gelled mineral oil has been found to be useful in a wide variety of mineral oil impregnated capacitors of up to 1000 volt rating. Another advantage of this invention is found in the higher rate of filtering than can be achieved with the mineral oil impregnant containing the low molecular weight polyethylene solute.

When the molecular weight of the polyethylene used is higher than 2,500, the dielectric strength of the mixture, particularly at room temperature, is lower and not too satisfactory by commercial standards. It is also important that the molecular weight of the polyethylene used be less than 2500 for if it is substantially above that the viscosities of mixtures of the polyethylene and oil are so high that impregnation is most difficult. It has been noted that with premolded resin encased paper capacitor sections that these viscosities available in higher molecular weight polyethylenes will produce under optimum conditions only partially impregnated sections.

This application is a continuation-in-part of my copending application, Serial No. 446,229, filed July 28, 1954, for "Electrical Capacitors," and now abandoned.

As many apparently widely different embodiments of this invention may be made without departing from the spirit and scope hereof, it is to be understood that the invention is not limited to its specific embodiments hereof except as defined in the appended claim.

What is claimed is:

An impregnated convolutely wound capacitor containing a non-dripping impregnant comprising convolutely wound electrode strata spaced by a convolutely wound porous spacing material in tightly wound sections substantially completely impregnated with a gelable non-dripping mineral oil composition consisting of a mineral oil and a hard crystalline polyethylene resin solute in the mineral oil in a proportion of from about 10% to 30% by weight of the mineral oil, said polyethylene resin having a resin transition temperature of over 110° C. and an average molecular weight of about 1000 to about 2500 to form a gel having a gelation temperature of at least 94° C., said composition being non-dripping at temperatures up to 110° C. when used as the impregnant in the before-mentioned capacitor.

References Cited in the file of this patent
UNITED STATES PATENTS 2,414,300    Hamilton _____ Jan. 14, 1947
2,615,955    McLean _____ Oct. 28, 1952